United States Patent [19]

Zbranek et al.

[11] 4,092,400
[45] May 30, 1978

[54] PROCESS FOR RECOVERING HIGH PURITY TUNGSTEN COMPOSITIONS FROM WOLFRAMITE ORES

[75] Inventors: Vladimir Zbranek; Zdenka Zbranek, both of Littleton; Daniel Arthur Burnham, Wheatridge, all of Colo.

[73] Assignee: Engelhard Minerals & Chemicals Corp., Iselin, N.J.

[21] Appl. No.: 786,081

[22] Filed: Apr. 11, 1977

[51] Int. Cl.² ............................................. C01G 41/00
[52] U.S. Cl. ................................ 423/54; 75/101 BE; 423/56; 423/58; 423/593
[58] Field of Search ................... 423/53, 54, 56, 58, 423/593; 75/101 BE

[56] References Cited

U.S. PATENT DOCUMENTS

| 1,388,857 | 8/1921 | Giles et al. | 423/58 |
| 3,052,516 | 9/1962 | Drobnick et al. | 423/54 |
| 3,206,303 | 9/1965 | Goren | 423/56 |
| 3,256,057 | 6/1966 | Burwell | 423/56 |
| 3,256,058 | 6/1966 | Burwell | 423/56 |

FOREIGN PATENT DOCUMENTS

| 249,303 | 1/1964 | Australia | 423/54 |
| 695,570 | 10/1964 | Canada | 423/56 |

Primary Examiner—Herbert T. Carter

[57] ABSTRACT

A process for recovering tungsten values in the form of ammonium paratungstate from tungsten ores and ore concentrates, particularly wolframite ores and ore concentrates, incorporating a plurality of steps for necessary removal of impurities and formation of the product ammonium paratungstate. The steps of the process include grinding, caustic leaching, filtrations, chemical treatment including acidification particularly for the removal of silica impurities, further filtration, solvent extraction of the tungsten values, stripping of the tungsten values from the solvent solution in the form of ammonium paratungstate, and recovery of the ammonium paratungstate product. The caustic leaching step may be carried out in the substantial absence of oxygen.

8 Claims, 1 Drawing Figure

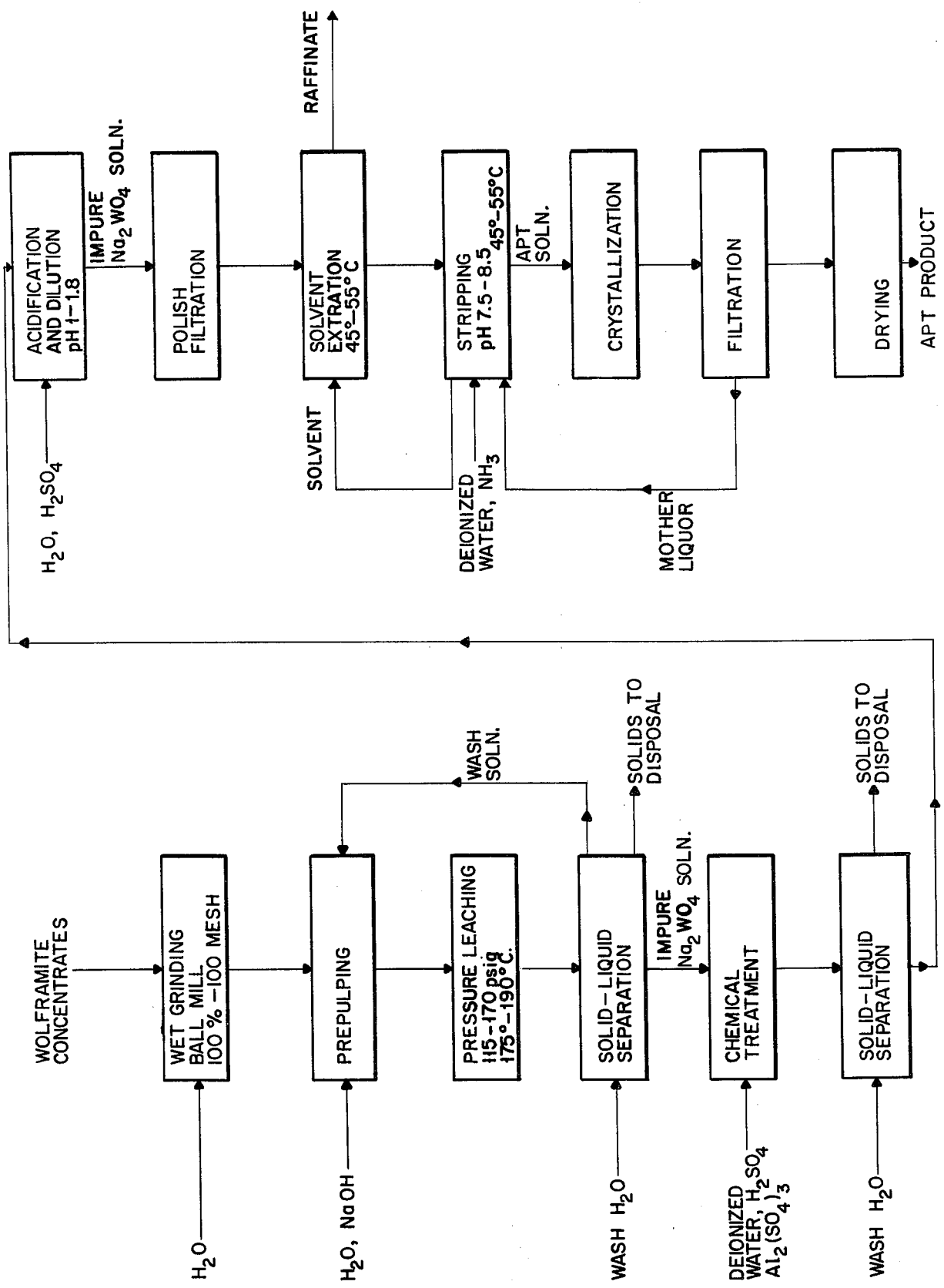

PROCESS FOR RECOVERING HIGH PURITY TUNGSTEN COMPOSITIONS FROM WOLFRAMITE ORES

BACKGROUND OF THE INVENTION

Various processes are known for the recovery of tungstem values from tungsten-containing ores. It is conventional in the prior art to recover from a beneficiated ore a relatively pure tungsten compound, which may be used in the manufacture of other compounds or from which may be extracted metallic tungsten. For example, ammonium paratungstate is used as the source of tungsten in the manufacture of filaments. The tungsten ores contain other chemical materials which may be carried through the recovery process and ultimately contaminate the product. For most applications, it is particularly important to remove the impurities during the recovery process.

The recovery of tungsten values from tungstencontaining ores is shown, for example, in U.S. Pat. No. 1,388,857-Giles et al. This patent does describe the necessity for grinding the initial tungsten ore to a mesh size of about 100 and also describes the alkali leaching of the ore with heat and pressure, followed by calcium treatment for the removal of silica and phosphorus impurities. Calcium tungstate is then recovered from solution, and is acidified and reduced with carbon to recover metallic tungsten.

Amine and organic solvent mixtures are employed to recover ammonium paratungstate according to U.S. Pat. No. 3,052,516-Drobnick et al. The importance of removal of silica as it might apply to the treatment of tungstate solution in the preparation of a purified tungsten product is also shown in U.S. Pat. No. 3,206,303-Goren. However, we have found that operating at a pH substantially different from that shown in Goren, in combination with the other improved features of this invention, provides substantially improved results.

Silica removal is also shown in Burewll U.S. Pat. No. 3,256,057, but a fluorine containing material must be employed for this removal. Obviously, there are inherent difficulties in handling fluorine containing materials, thus making processing according to the patent less practical than would be desired. In addition, Burwell U.S. Pat. No. 3,256,058 uses the fluorine containing materials in addition to a fusion step, but does show the removal of silica impurities following removal of molybdenum impurities, by changing the pH level of the solution to about 8.

While the process as described here, and in the remainder of the specification, is related to an ore concentrate, it will be apparent that an untreated ore could be employed. Preferably, the ore is beneficiated to increase the tungsten content prior to treatment.

SUMMARY OF THE INVENTION

According to the present invention, a plurality of steps are employed to recover a purified tungsten material, in the form of ammonium paratungstate, from a tungstencontaining ore. The final product, ammonium paratungstate, which may hereinafter be referred to as APT, is believed to have the formula:

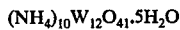

$(NH_4)_{10}W_{12}O_{41} \cdot 5H_2O$

The steps involved in recovering the APT from the tungsten-containing ore include the following: (1) wet grinding of the wolframite ore concentrate to a minus 100 mesh particle size; (2) pressure leaching of the ground ore with caustic, desirably in the substantial absence of oxygen, to form a tungstate salt solution; (3) filtration of the solution to remove solid impurities; (4) chemical treatment followed by filtration of the tungstate solution to remove certain impurities, particularly silica; (5) acidification of the solution and polish filtration to remove any solids which may precipitate upon acidification; (6) solvent extraction of tungstate materials employing a mixture of amines in organic solvent under particular conditions; (7) stripping of the tungstate values from the solvent solution as APT, employing an aqueous ammonia solution; and (8) recovery of the APT product from the aqueous solution.

It is important in the treatment of the crude sodium tungstate formed in the pressure leaching that the pH of the tungstate solution be reduced to about 8 to 11 for chemical treatment to remove silica. Further, prior to solvent extraction, the pH of the tungstate solution should be reduced to about 1 to 2, to allow for a tungsten loading in the solvent phase in excess of about 100 grams per liter. The stripping of the APT from the solvent solution is accomplished while maintaining the pH of the aqueous phase at about 7.5 to 8.5 and allowing sufficient retention time, while agitating, to insure redissolution of the APT solids.

It has unexpectedly been discovered that in carrying out the solvent extraction step under the conditions of the present invention, as contrasted with those of the prior art, that significant improvements are obtained in the process.

BRIEF DESCRIPTION OF THE DRAWINGS

A flow diagram, generally indicating the steps in the process of the present invention, is shown in the single FIGURE of drawings.

DESCRIPTION OF THE PREFERRED EMBODIMENTS

The starting material for the process of the present invention is wolframite ore or, preferably, such an ore concentrate. The tungsten concentration of the ore or concentrate is not critical, and it may contain as much as 76.5% tungsten trioxide. In addition to the tungsten values in the ore or concentrate, various impurities are generally present. These impurities generally include silica, manganese, iron, calcium, tin, molybdenum, copper, and arsenic. During the processing according to the present invention, these impurities will either be removed or will be reduced to an acceptable level in the final product. Although processing of an ore is sometimes referred to, it will be appreciated, by those skilled in the art, that this ore is, preferably, a concentrate which has been beneficiated to increase the tungsten values.

The ore employed is first reduced in size, by wet grinding, to a minus 100 mesh particle size. Grinding can be carried out in any type of conventional equipment, such as a ball mill. The grinding is important or the ore cannot be handled in subsequent processing steps. As indicated, the grinding is to a minus 100 mesh particle size, preferably in the range of about 30 microns to 100 mesh (about 150 microns). If the grinding is not sufficient to reduce the particle size to a minus 100 mesh particle size, there is insufficient reactivity. On the other hand, if the material is ground too fine, there are problems in subsequent processing both in handling and in filtration. Further, grinding to too fine a size requires additional energy, without additional benefit in processing.

The ground wolframite ore is generally contained in a slurry having a solids concentration of about 150 to 300 grams per liter, preferably 200 to 250 grams per liter. This amount is merely the result of standard processing and has been found an acceptable range of solids for further processing according to the present invention. Too dilute a slurry is impractical, requiring the pumping of large volumes; too concentrated a slurry is extremely difficult to pump and may result in the formation or more sodium tungstate than is soluble under the processing conditions.

The wolframite ore slurry is treated with a caustic material in order to convert the tungsten values to a soluble tungstate. This is accomplished by a pressure leaching at elevated temperatures. The caustic material preferably used is sodium hydroxide. While carbonate materials such as sodium or potassium carbonate can, theoretically, be employed, the rate of reaction of the tungsten trioxide with the carbonate materials is too slow. Potassium hydroxide can also be employed in this stage of the process, but it is more expensive than sodium hydroxide and gives no additional benefits. The amount of caustic material employed is that required stoichiometrically for reaction with the tungsten trioxide present in the slurry. If desired, up to an additional 5 percent, based upon the stoichiometry, of the caustic material can be used to assure completion of the reaction in accordance with standard processing practice.

As previously indicated, this leaching step is carried out under pressure and at elevated temperatures. The leaching operation, which preferably is allowed to continue for about 4 hours, is carried out at pressures of about 35 to 355 psig, preferably about 115 to 170 psig. The temperature employed for the leaching step is from about 135° to 225° C., preferably about 175° to 190° C. The concentration of the caustic in the pressure leaching, particularly with sodium hydroxide, is from about 5 to 15 percent, preferably about 7 to 10 percent. While the extraction can be carried out at lower temperatures and pressures indicated, tungsten recovery from wolframite is essentially complete. If the ore also contains scheelite ($CaWO_4$), the tungsten present in this material form will not be extracted.

It is desirable in the pressure leaching step not to add air or oxygen in generating the pressure. While the tungsten recovery percentage is only slightly affected by substantial presence of air or oxygen, the inclusion of oxygen does present other significant problems. For example, the filtration rate of the dissolved product is decreased when oxygen is included and the dissolution of many of the impurities is increased. In particular, molybdenum, if allowed to remain in the process in substantial quantities, the change of which is increased with the inclusion of oxygen, tends to form anionic compounds similar to the tungsten material which would "follow" the tungsten materials through the solvent extraction process. Inert gases, such as nitrogen, may be used in the pressure leaching step.

Following the pressure leaching step, in which the tungsten values are converted to soluble tungstates, particularly sodium tungstate when sodium hydroxide is employed, the resulting slurry is filtered. This filtration is carried out at 20° to 65° C. The filtrate, containing the crude sodium tungstate, is the desired product of this step of the process and is employed in the subsequent purification steps, to be described in more detail below. The solids resulting from the filtration may be disposed of, or, if they contain sufficient desirable values, may be further processed for the recovery of those values in processes not forming a part of the present invention.

A major impurity in the processing of tungsten ores is silica. The gross amounts of silica may not be large, but for certain uses such as in the production of tungsten filaments, the amount of silica must be below 0.0086 percent. It is important that the silica be removed to attain, at most, that percentage in the final product. It is by treatment of the sodium tungstate solution that this reduction in silica is obtained. According to the prior art, the silica reduction was obtained by reducing the pH to less than 8 and adding an aluminum salt in order to precipitate the silica.

In accordance with the process of the present invention, the pH is, again, reduced, but to a particular level. The desired pH, at this stage of the process, is from about 8 to 11, preferably about 9.5 to 10. If the pH is above 11, efficient precipitation is prevented because of the increased solubility of the sodium silicate. This change in pH is accomplished by treating the alkaline solution from the pressure leaching with a sufficient amount of a mineral acid, such as sulfuric acid. In addition, the filtrate from the pressure leaching operation must be treated with a salt which will combine with the silica in order to form a precipitate containing the silica. While various aluminum and magnesium salts can be used, the preferred materials are aluminum sulfate and sodium aluminate, which are added in amounts stoichiometrically equivalent to the silica. The compound believed to be formed in the reaction with aluminum and upon which the stoichiometric equivalence is based is:

$$Na_2O \cdot Al_2O_3 \cdot 6SiO_2.$$

If desired, the amount of the aluminum salt, particularly aluminum sulfate, can be in a five percent excess, based upon the stoichiometric ratios to assure completion of reaction in accordance with standard processing practice.

If the silica is not removed from the solution at this point it will tend to form heteropoly silico-tungstate acids. These complexes are extracted into subsequent organic phases during solvent extraction and are stripped by the ammonia into the APT solution. Thus, the silica, if not removed at this point in the processing, will contaminate the final APT product when it is recovered. In addition, both silica and the heteropoly silico-tungstic acids interfere with operation of the solvent extraction circuit. When mixed with the organic amine extractants employed in that stage or the processing, the silica compounds polymerize to form semi-permanent emulsions and heavy, viscous precipitates which result in both tungsten and solvent losses.

In addition to the pH reported above, which is generally important to operation of this phase of the process, and to the reactant ratios, the precipitation reaction should take approximately one hour and should be carried out at approximately ambient conditions, i.e., 20° to 30° C. As much as 4 to 6 hours can be employed for the reaction of the aluminum salt with the silica. As indicated, ambient temperature is the best for proceeding with the process. In fact, at higher temperatures, the silica content may actually be increased. Further, at pH levels about about 11, the solubility of sodium silicate can prevent the efficient precipitation of the complex sodium aluminum silicate referred to above. At pH less than about 8, silica precipitation is incomplete.

Following the treatment of the sodium tungstate solution with aluminum sulfate in order to remove the silica, the resulting material, containing precipitated silica in the form of the complex salt previously described, is filtered in order to remove the silica. The silica removed by filtration, generally, is discarded, though it is generally water washed in order to remove any remaining sodium tungstate which may be entrapped in the filter cake. The sodium tungstate filtrate is recovered for further processing according to the present process.

The thus recovered sodium tungstate solution is subjected to solvent extraction for further purification and conversion to APT. However, prior to that solvent extraction, the sodium tungstate solution is acidified to a pH of from about 1 to 1.8, preferably about 1.5, and can also be diluted. The pH reduction is accomplished by the addition of sufficient sulfuric acid, and the dilution by the addition of water. The concentration of the sodium tungstate, at this point, is about 100 to 200 grams of tungsten trioxide per liter, preferably 100 to 150 gpl. If the concentration at this point is too high, there is a difficulty in extraction, as will be discussed below. The pH range at this step of the processing is important and is substantially different from the range set forth in the prior art. Below a pH of about 1, tungstic acid tends to precipitate, thus rendering the subsequent solvent extraction step ineffective, while above a pH of about 1.8, the raffinate from the solvent extraction has a high tungsten content, thus indicating a greater loss of tungsten. Above a pH of 1.8 phase separation becomes substantially slower and emulsion problems are encountered. By achieving a pH and a concentration in the ranges shown, the loading of the tungsten material in the solvent phase of the solvent extraction is high and, in fact, is substantially higher than the loadings obtainable according to the prior art, as will be detailed below. These conditions also favor the extraction of polytungstate species to the exclusion of less highly charged anionic species such as sulfate, as will be discussed below.

The solution resulting from the combination of acidification and dilution at this point in the process may contain additional inorganic precipitates. Therefore, the solution is polish filtered in order to remove these precipitates, and the clarified liquor is then directed to storage tanks from which the material is fed to the solvent extraction circuit.

The tungsten values are obtained from the acidified filtrate of the previously described step. By countercurrently contacting that filtrate with an amine, where the amine is carried by a solvent diluent, the tungsten values are extracted into this solvent phase. One type of amine which can be employed is a tertiary organic amine having a mixture of carbon chains containing from 8 to 10 carbon atoms. Such an amine is sold commercially as Alamine 336 by General Mills Chemicals, Inc. and as Adogen 364 by Ashland Chemical Co. Among the other amines which can be employed are those described in U.S. Pat. No. 3,052,516, previously referred to. Those amines include materials which are generally aliphatic in character, though the amines may be partially aromatic. In general, these amines are either secondary or tertiary amines, the preferred amines being the secondary or tertiary amines containing aliphatic hydrocarbon groups of from about 8 to 22 carbon atoms. The carbon substituents, when not aromatic, can be saturated, unsaturated, straight chain, highly branched, or any combination of these, so long as they are capable of extracting the tungsten values from the acid solution.

The amines, as indicated, are diluted in organic solvents. The most generally employed solvent for these materials is kerosene. However, the diluent can be, essentially, any aromatic or aliphatic solvent which does not interfere with the reactants under the conditions of reaction. For example, the diluent can be benzene, xylene, petroleum ether, etc. Further, the organic diluent should contain a modified such as a ketone, organophosphorus compound, or alcohol. An alcohol is preferred since it is equal in performance to the other modifiers and is available at a lower cost. The molecular weight range of the preferred alcohol, as indicated by the chain length of the carbon member, is generally an alcohol having from 6 to 10 carbon atoms. If the length of the carbon chain is too low, the material is excessively water soluble and fails to operate properly in the extraction process. If the carbon atom chain is too long, solution of the amine is not effectively carried out. In general, the ratios of amine, alcohol, and diluent should be in the range of about 1 to 1.5 parts, by volume, of alcohol, and 2.5 to 12 parts of kerosene, by volume, for each volume of the amine employed.

Employing the organic solvent-amine mixture just described, with the pH in the range set forth, it was possible to obtain tungsten loadings in the organic phase of the extraction process from 100 to 150 grams per liter tungsten trioxide. In fact, loadings of up to 300 grams per liter were possible, though these loadings were found to be too viscous to be handled in the solvent extraction process. These loadings are substantially higher than those obtainable by prior processes, where loadings of up to 25 to 30 grams per liter are described. It is believed that these higher loadings are obtained due to the formation of the series of complex polytungstates at the pH set forth with increased weight to charge ratios. As an example, polytungstates may be formed according to the equation:

$$12WO_4^{2-} + 18H^+ \rightarrow W_{12}O_{39}^{6-} + 9H_2O$$

The organic extractant preferentially loads the more highly charged polytungstate complexes which, when fully loaded, tend to exclude the loading of less highly charged impurities, such as sulfate or molybdate. The greater tungsten weight to charge ratio of the polytungstate species at low pH results in the increase in the amount of tungsten that can be extracted by the organic. The high organic loading results in better impurity control, and because less organic solvent is required, solvent losses and the required solvent inventory are substantially reduced giving an economic advantage over prior art processes. The desired loading of tungsten in the organic phase is from 100 to 150 grams per liter as $WO_3$.

It has been found that a two stage solvent extraction process is generally desired. The temperature in this extraction process should generally be from about 30° to 60° C., preferably from about 45° to 55° C. At the increased temperatures, improved separations are attained. However, if the temperature is raised too high, problems may be encountered because of the presence of relatively low boiling organic materials which may be evaporated and/or cause hazardous conditions. The pH should be maintained, by continuing acid addition, at about 1.0 to 1.8, preferably at about 1.5, similar to the pH of the acidified sodium tungstate feed solution. If the pH is reduced below 1.0, again, tungstic acid tends to precipitate from the solution. At pH levels above 1.8, tungsten extraction is incomplete and phase separation is substantially slower.

In the two stages set forth for the solvent extraction process, the ratio of organic to aqueous materials should be in the range of 1:0.8 to 1:1.5. Preferably, this range is closer to 1:1.

Following extraction, the pregnant organic is washed with deionized water in a two-stage wash circuit to remove entrained impurities, primarily sodium sulfate, suspended in the organic phase. Without the wash circuit, sodium sulfate would carry over into the strip solution to contaminate the final APT product.

Following the wash cycle the tungsten values are stripped from the organic solvent by adding ammoniated water, preferably at 40° to 50° C. The concentration of ammonia in the ammoniated water is about 1.3 weight percent ammonia, but it should be understood that such concentration can be varied, depending upon the concentration of tungsten at any given pH. More than 98 percent of the tungsten has been stripped, employing the above conditions from the solvent extraction process, in seven minutes. However, it has been found that about 10 minutes is required to strip 100 percent of the tungsten. Therefore, even if a plurality of mixers are required, a 10 minute mixer time is desirable. The temperature in this strip process is preferably from about 45° to 55° C.

The elevated temperature accelerates phase disengagement and increases the concentration of APT that can be achieved in the aqueous strip solution. In this stripping process, the tungsten values are reacted with the ammonia to form the desired APT.

The mixing time is extremely important. It has unexpectedly been found, according to the present invention, that upon initiation of strip mixing, the APT begins to precipitate. This precipitation continues for up to 4 to 5 minutes after initiation of mixing, but APT solids then begin to redissolve, so long as mixing agitation is continued. By assuring a retention time of at least 10 minutes, it can be reasonably assured that all of the APT will be in solution for further processing. Further, in addition to the time factor for mixing, the pH is significant. The pH at this point of processing should be maintained at about 7.5 to 8.5. If the pH is above 8.5, there will be only limited redissolution of the APT. If the pH is less than 7.5, stripping is incomplete.

The ratio of the ammoniated aqueous and organic phase in the stripping operation is generally about 1:1. The organic to aqueous ratio can be as high as 3.7:1. The organic phase which is recovered from this stripping operation can be recycled to the organic extraction process. However, the ammonia must be removed from the organic phase before recycling and this is, generally, easily accomplished by washing the organic phase, after stripping, with deionized and/or acidified water and then separating the water prior to return of the organic phase.

The desired APT product can then be recovered from the ammoniated water solution. While the APT can be recovered from solution by the known technique of evaporative crystallization, we have found as a further modification that APT may be crystallized by cooling the hot strip solution. The standard practice of the prior art did not allow for crystallization by cooling because of the high solubility of the materials in the solution at the lower temperatures. Recovery of the materials, here, is achieved only because of the high concentrations which are achieved according to the process of the present invention.

After filtration to recover APT, the mother liquor is recycled to the strip circuit where, after pH adjustment, it is reloaded with APT at a temperature of 45° to 55° C. This procedure eliminates the need for additional evaporation stages, resulting in substantial savings in equipment cost. The APT product is dried in accordance with the practice of the prior art to yield a material having substantially less than the 50 ppm silica limitation and less than 10 ppm sodium, again substantially less than the requirements for tungsten to be used in further processing.

In order that those skilled in the art may be better enabled to carry out the processes of the present invention, the following examples are given by way of illustration, and not by way of limitation:

EXAMPLE 1

As an example of a process embodying the steps of this invention, a high-purity ammonium paratungstate sample (APT) was prepared from a wolframite concentrate containing 65% $WO_3$ and 1.3% $SiO_2$. The wolframite concentrate was dry ground to 100% minus 100-mesh in a ball mill. A mixture of 8.75 kg ground ore and 35 liter caustic solution containing 2.99 kg NaOH was charged to an autoclave, and the slurry was pressure leached at 155° C. and 65 psig total pressure for 4 hours.

The leach slurry was filtered and the filter cake washed with water to produce an alkaline sodium tungstate solution containing 151 gpl $WO_3$ and 0.288 gpl $SiO_2$. The dry residue represented 30.0% of the original concentrate weight and contained 4.9% $WO_3$. Tungsten recovery was 98.5%.

Silica impurities were precipitated from the leach solution by first acidifying the solution to a pH of 9.5 with sulfuric acid. To the solution was added 15.3 g hydrated aluminum sulfate (Al to $SiO_2$ ratio is 1:6.7) to form an insoluble compound of silica. After 2 hours mixing the solution was filtered and the precipitated silica compound separated. The filtrate was acidified to pH 1.5 with sulfuric acid and diluted with water to produce a solvent extraction feed solution.

From the acidified feed solution containing 112.3 gpl $WO_3$ and 0.022 gpl $SiO_2$, 99.9% of the tungsten was extracted in two stages of a standard mixer-settler solvent extraction circuit by mixing 3 minutes (aqueous continuous mixing) to 50° C with an organic to aqueous phase ratio of 1:1. The organic solution contained 10 vol % Alamine 336, 15 vol % isodecanol and 75 vol % kerosene. The organic loading was approximately 112 gpl $WO_3$. Sulfuric acid, at 200 gpl $H_2SO_4$, was added to the primary extraction mixer to maintain a pH level of 1.5.

Sodium and sulfate ion impurities, contained in the entrained aqueous phase, were removed from the pregnant organic by scrubbing the organic phase twice with deionized water at an organic to aqueous phase ratio of 1:1 at 50° C.

From the pregnant organic, 98.2% of the contained tungsten was stripped in one strip stage by mixing 10 minutes (aqueous continuous mixing) at a mixer organic to aqueous phase ratio of 1:1 using a strip solution containing 1.31% $NH_3$ at 50° C. An aqueous recycle was used to increase the tungsten concentration in the strip solution to 166 gpl $WO_3$. Impurity levels in the strip solution were low at 10 ppm sodium and 11 ppm $SiO_2$.

A strip liquor sample was evaporated to 7–8% of the original volume to crystallize and precipitate APT solids. The separated and washed APT crystals analyzed;

| | |
|---|---|
| $WO_3$ | 87.4% |
| $SiO_2$ | 0.0049% |
| Na | 0.0010% | used as feed to the extraction circuit. The solutions were preheated to 50° C and pumped to the mixers at an organic: aqueous ratio of 1:1. The flow rates were adjusted to provide 3 minute retention in the mixer. Mixing was aqueous continuous.

Acid containing 20% $H_2SO_4$ was added to the second extraction mixer to control the pH. The pH was varied over the range of 1.0–2.5. No acid was added to the primary extraction cell. At 15 minute intervals, over a period of 3.5 hours continuous operation, aqueous samples were taken from both extraction settlers to determine the extraction efficiency. The results are tabulated in Table 1.

Table 1

EFFECT OF pH ON TUNGSTEN EXTRACTION
CONTINUOUS OPERATION OF THE LABORATORY SOLVENT EXTRACTION CIRCUIT:
EXTRACTION AND WASH SECTIONS

| Operation | Flow Rates, ml/min. | | | | Temperature, °C | | | | pH | Raffinate gpl $WO_3$ | |
|---|---|---|---|---|---|---|---|---|---|---|---|
| (hrs) | Feed | Organic | Wash-1 | Wash-2 | Ext-1 | Ext-2 | Wash-1 | Wash-2 | Ext-2 | Ext-1 | Ext-2 |
| 0 | 100 | 100 | 102 | 100 | 50 | 46 | 50 | 50 | 1.5 | — | 0.186 |
| 0.25 | 100 | 100 | 104 | 98 | 50 | 46 | 50 | 45 | 1.0 | | 0.205 |
| 0.50 | 100 | 100 | 102 | 100 | 50 | 46 | 50 | 50 | 1.0 | | 0.210 |
| 0.75 | 100 | 100 | 102 | 98 | 50 | 50 | 50 | 50 | 1.2 | | 0.320 |
| 1.0 | 104 | 100 | 102 | 98 | 50 | 50 | 50 | 50 | 1.2 | 95 | 0.285 |
| 1.25 | 102 | 100 | 104 | 98 | 52 | 50 | 50 | 50 | 1.3 | 96 | 0.420 |
| 1.50 | 98 | 98 | 102 | 96 | 50 | 50 | 50 | 50 | 1.5 | 98 | 0.300 |
| 1.75 | 102 | 100 | 102 | 98 | 50 | 50 | 50 | 50 | 1.5 | 98 | 0.280 |
| 2.00 | 100 | 100 | 104 | 98 | 50 | 48 | 50 | 45 | 1.6 | 104 | 0.637 |
| 2.25 | 104 | 100 | 102 | 100 | 50 | 49 | 50 | 48 | 1.75 | 108 | 2.3 |
| 2.50 | 100 | 100 | 102 | 100 | 50 | 50 | 50 | 52 | 1.8 | 109.5 | 0.773 |
| 2.75 | 98 | 98 | 102 | 102 | 48 | 51 | 50 | 50 | 2.0 | 111 | 0.494 |
| 3.00 | 100 | 96 | 100 | 100 | 48 | 48 | 50 | 50 | 2.0 | 112 | 0.543 |
| 3.25 | 100 | 96 | 100 | 100 | 50 | 50 | 50 | 50 | 2.5 | 114 | 0.500 |
| 3.50 | 105 | 120 | 110 | 108 | 40 | 50 | 50 | 50 | 2.5 | 118 | 0.510 |
| Average: | 101 | 100 | 103 | 100 | 50 | 49 | 50 | 49 | | | |

One of the novel features of the process is a method for the removal of silica from the crude sodium tungstate solution prior to solvent extraction. Silica, if not removed, will create problems in the solvent extraction circuit and contaminate the final APT product. The following example is illustrative of this aspect of the invention.

EXAMPLE 2

Several sodium tungstate solutions prepared by the pressure leaching of various wolframite ores with caustic as described above were treated to remove silica. The pH of the solutions was adjusted to 9.5 with concentrated sulfuric acid. Aluminum sulfate, $Al_2(SO_4)_3 \cdot 18H_2O$, was added at room temperature, about 26° C., such that the aluminum to silica weight ratio was 1:6.7 (0.149 g Al/1.000 g $SiO_2$ in the untreated solution). The treated solutions were stirred and samples taken and analyzed for dissolved silica periodically. The results are tabulated below.

| | Dissolved Silica (ppm $SiO_2$) | | | |
|---|---|---|---|---|
| Time (hr) | Soln 1 | Soln 2 | Soln 3 | Soln 4 |
| 0 | 88 | 130 | 340 | 625 |
| 1 | 21 | 47 | 23 | 23 |
| 2 | 23 | 45 | 22 | 23 |
| 3 | 23 | 43 | 21 | 23 |
| 4 | 27 | 41 | 20 | 20 |

EXAMPLE 3

A sodium tungstate solution obtained substantially as in Example 1 contains 134 gpl $WO_3$ and less than 100 ppm $SiO_2$ at pH 1.5, and the solvent contains 10 vol % Alamine 336 and 15 vol % isodecanol in kerosene were The best extraction is obtained at the lower pH. As the pH was increased from 1.0 to 2.5, the extraction efficiency (total amount of tungsten extracted in two stages) decreased from 99.9 to 99.5%. In this pH range, the change in extraction is gradual, but with further increase in pH above 2.5, there is marked decrease in extraction efficiency. There is another advantage to operation in the lower pH range. At pH levels greater than 1.8, stable emulsions were formed which were difficult to break. When the pH was kept below 1.8, no emulsion problems were observed, and phase separation was rapid. However, there is a limit to the amount of acid that can be added. At a pH of about 1.0 or less, tungstic acid precipitates from solution and, once formed, the solids are difficult to redissolve. The extraction mixer can be operated in a pH range of 1.0 to 1.8, but the preferred ph is a midpoint at 1.5.

EXAMPLE 4

Bamin concentrate, a high-arsenic wolframite ore, was doped with molybdenite to increase the molybdenum content, then pressure leached to determine the extent to which arsenic and molybdenum dissolved. Crude sodium tungstate solutions obtained during the autoclave tests were acidified with sulfuric acid to pH 1.5 and the precipitates which were formed during acidification were filtered and analyzed by emission spectrography.

Three pressure leach tests were conducted. The pressure leach conditions used were:

| | |
|---|---|
| Ore charge | 230 grams |
| Temperature | 175° C |
| Pressure | 130 psi (steam only) |
| Leach solution | 7.0% NaOH |
| Slurry density | 18.7% solids |

-continued

| Reaction time | 4.0 hours |
|---|---|

Bamin concentrate, containing 67.8% $WO_3$, 1.04% As and less than 0.01% Mo, was doped with molybdenite to increase the molybdenum concentration to 0.03%. This concentrate, a reject sample of oversize material from previous grinding tests, was stage ground to −100 mesh particle size prior to use. The results of the leach tests are shown in Table 2.

Table 2

| Pressure, psi | | Percent Extraction | | |
|---|---|---|---|---|
| Test | Steam | $WO_3$ | As | Mo |
| 1 | 130 | 92.9 | 18 | 29 |
| 2 | 130 | 92.6 | 23 | 14 |
| 3 | 130 | 92.6 | 15 | 18 |

As can be seen from Table 2, tungsten extraction averaged 92.7% $WO_3$. The harder material (grinding test rejected sample) was more recalcitrant to pressure leaching than the other sample.

To determine the effect of oxygen on the leach solutions a fourth pressure leach test was conducted using a 65 psi oxygen over pressure in addition to the leach conditions described above. The oxidized crude sodium tungstate solutions and each of the non-oxidized solutions prepared in accordance with the results of Table 2 above were acidified with sulfuric acid to pH 1.5. The oxidized leach liquor, containing 171 gpl $WO_3$, 0.725 gpl As, 0.083 gpl Mo, and 0.598 gpl $SiO_2$, formed no precipitate when acidified to pH 1.5. In contrast, the nonoxidized solutions formed precipitates on acidification containing arsenic, molybdenum, tin, silica, and sulfur as the major constituents, without loss of tungsten.

If the impurities are present as sulfides in the wolframite, the impurities would partially dissolve in caustic leach solution, and would precipitate when the leach solution is acidified to a pH less than about 4. In the presence of oxygen, the dissolved sulfides would be oxidized and the oxidized species would not precipitate at pH 1.5. Leaching in the substantial absence of oxygen provides a method of processing high-arsenic and high molybdenum ores, since less of the contaminants are dissolved than in the presence of oxygen, and the solutions are further purified by precipitation of the inorganic impurities when the solution is acidified to pH 1.5.

EXAMPLE 5

Bamin concentrate, a high arsenic wolframite ore, was doped with molybdenite to increase the molybdenum content. This concentrate was the same Bamin concentrate as used in Example 4. The sample was stage ground to a minus 100 mesh particle size.

The material was subjected to a caustic leach at a temperature of 200° C and at a pressure of 226 psig steam. The leaching was accomplished with a sodium hydroxide concentration of 7% and the slurry density was approximately 18.7% solids. Pressure leaching in an autoclave was carried out for 4 hours. The product from the leaching was filtered and the filtrates analyzed for tungsten, arsenic, molybdenum, and silica. The results are shown below in Table 3:

Table 3

| PRESSURE, PSI STEAM | PERCENT EXTRACTION | | |
|---|---|---|---|
| | $Wo_3$ | As | Mo |
| 226 | 98.5 | 18 | 15 |

The filtrate of Table 3 was treated with sulfuric acid to reduce the pH to 1.5. A brown colored precipitate formed which contained arsenic, molybdenum, tin, silica, and sulfur as the major constituents. The precipitate was filtered from the solution and the new filtrate analyzed 145 gpl tungsten trioxide, 0.203 gpl arsenic, 0.001 gpl molybdenum, and 0.045 gpl silica. This analysis contrasts with the analysis of the filtrate before acidification and filtration, which, while having the same 145 gpl tungsten trioxide, also had 0.334 gpl arsenic, 0.003 gpl molybdenum, and 0.062 gpl silica.

While a certain illustrative process embodying the present invention has been shown in the drawing and described above in considerable detail, it should be understood that there is no intention to limit the invention to the specific form disclosed. On the contrary, it is the intention to cover all modifications, alternatives, equivalents and uses falling within the spirit and scope of the invention as expressed in the appended claims.

What is claimed is:

1. In a process for the recovery of tungsten values, in the form of ammonium paratungstate, from wolframite-bearing concentrates, wherein the concentrate has been ground, to approximately 100 mesh size or less caustic leached to form a tungstate solution, the tungstate solution chemically treated with an inorganic metal salt to precipitate silica, the resultant tungstate solution solvent extracted utilizing amine and organic solvent mixtures, and the solvent solution treated with ammoniated water to strip ammonium paratungstate from the solvent solution, the improvement which comprises:
    (a) accomplishing said caustic leaching at pressures of from about 35 to about 355 psig and temperatures of from about 135° to about 255° C to produce a slurry; thereafter
    (b) filtering said slurry to obtain a filtered tungstate solution;
    (c) in said chemical treatment, the steps of adding acid to the tungstate solution to reduce the pH to about 8 to 11, adding said inorganic metal salt to precipitate silica, and recovering a tungstate solution substantially free of silica;
    (d) acidifying to reduce the pH of the resultant tungstate solution prior to solvent extraction to a range from about 1 to 1.8 and maintaining the pH in this range during solvent extraction, whereby, upon solvent extraction, loading in the solvent phase in excess of about 100 grams per liter of tungstic oxide is achieved;
    (e) accomplishing said stripping while maintaining the aqueous phase at a pH of about 7.5 to 8.5 and allowing sufficient retention time, accompanied by agitation, such that solids of ammonium paratungstate formed redissolve; and
    (f) recovering ammonium paratungstate from the resulting solution.

2. The process of claim 1, wherein the concentration of tungsten trioxide, prior to solvent extraction, is in the range of from 100 to 150 grams per liter.

3. The process of claim 1, wherein recovery of the ammonium paratungstate is accomplished by cooling of the ammonium paratungstate solution to crystallize the ammonium paratungstate.

4. The process of claim 3, wherein the depleted ammonium paratungstate solution, after ammonium paratungstate crystallization, is recycled to the strip circuit to be reloaded with ammonium paratungstate at pH 7.5 to 8.5 and a temperature of 45° to 55° C.

5. The process of claim 1, wherein the solvent loading is carried out at a temperature of 45° to 55° C.

6. The process of claim 1, wherein the stripping is carried out at a temperature of 45° to 55° C.

7. The process of claim 1, wherein the inorganic metal salt is selected from the class consisting of aluminum sulfate and sodium aluminate.

8. The process of claim 1, wherein:

the precipitation of silica is accomplished at ambient temperatures and pressures and allowed to proceed for about 1 hour;

said filtering is accomplished at a temperature of from about 20° C to about 65° C;

said solvent extraction is accomplished utilizing a solvent comprising a solvent modifier consisting of a ketone, an organophosphorous compound, or an alcohol;

said solvent extraction is followed by a wash step wherein the pregnant organic is washed with de-ionized water, thereby to remove entrained impurities; and said stripping of the ammonium paratungstate from the solvent solution is accomplished over a period of time of at least about 10 minutes.

* * * * *

UNITED STATES PATENT AND TRADEMARK OFFICE
CERTIFICATE OF CORRECTION

PATENT NO. : 4,092,400
DATED : May 30, 1978
INVENTOR(S) : ZBRANEK, et al

It is certified that error appears in the above-identified patent and that said Letters Patent are hereby corrected as shown below:

In Column 3, line 13, the word "or" should be --of--.

In Column 4, line 54, the word "or" should be --of--.

In column 4, line 68, remove [about about] and insert --above about--.

In Column 6, line 14, "modified" should be --modifier--.

In Column 10, Table 1, the sixth column entitled "Ext-1", the last figure before the average should be changed from "40" to --50--.

Signed and Sealed this

Twentieth Day of March 1979

[SEAL]

Attest:

RUTH C. MASON
Attesting Officer

DONALD W. BANNER
Commissioner of Patents and Trademarks